United States Patent Office 3,545,992
Patented Dec. 8, 1970

3,545,992
RED DYE-PIGMENTS
Otto Christmann, Ludwigshafen (Rhine), Claus Bernhard, Mannheim, and Erwin Plankenhorn, Ludwigshafen (Rhine), Germany, assignors to Badische Anilin- & Soda-Fabrik Aktiengesellschaft, Ludwigshafen (Rhine), Germany
No Drawing. Filed Feb. 9, 1967, Ser. No. 614,820
Claims priority, application Germany, Feb. 19, 1966, 1,544,395
Int. Cl. C08h *17/14*
U.S. Cl. 106—288  2 Claims

ABSTRACT OF THE DISCLOSURE

New red calcium and barium complexes of azo dyes which lend themselves admirably for use as dye-pigments owing to their valuable tinctorial properties.

Red pigments are known which are metal complexes of azo dyes and which may be produced by reacting azo compounds obtained from o-amino-benzenesulfonic acids and β-hydroxynaphthoic acid with calcium or barium salts. As these pigments do not satisfy exacting requirements with regard to tinctorial strength and fastness to light, there has been a desire to find new red pigments of the azo series having high tinctorial strength and fastness to light.

The new pigments of this invention whose properties are considerably superior to those of the prior art pigments have the general formula

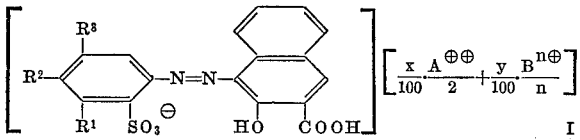

where $R^1$ is hydrogen or, together with $R^2$, denotes the radical —CH=CH—CH=CH—, $R^2$ is hydrogen or chlorine atom, a methyl group or, together with $R^1$, denotes the radical —CH=CH—CH=CH—, $R^3$ is a hydrogen or chlorine atom or a methyl group, A is calcium or barium, B is magnesium, nickel, cobalt, aluminum or chromium, $x$ has a value from 70 to 99.5, $y$ has a value from 0.5 to 30, $x+y$ being equal to 100, and $n$ denotes the valence of the cation of B.

The new dye-pigments are prepared by reacting azo dyes of the formula

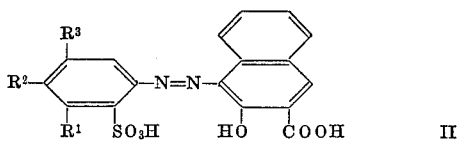

where the radicals R have the above meanings, in aqueous medium at temperatures up to 100° C. with calcium or barium salts and with magnesium, nickel, cobalt, aluminum or chromium salts, the ratio of calcium or barium salt to magnesium, nickel, cobalt, aluminum or chromium salt being from 99.5:70 to 0.5:30, based on equivalent weights.

The reaction of azo dyes of the Formula II with the said metal salts, preferably the chlorides or acetates, is carried out by methods conventionally used for the manufacture of dye lakes. The process is carried out in aqueous medium at temperatures up to 100° C. The pH of the reaction mixture is advantageously between 7 and 12, the reaction medium preferably being neutral at the end of the reaction. The total amount of metal salts is at least the stoichiometric amount, based on azo dye. An excess of metal salt mixture up to two or three times the stoichiometric amount is not detrimentel.

The azo dyes are preferably reacted with the metal salts in the presence of surface-active substances, such as resin soap obtainable by boiling a natural resin with caustic soda solution, and ethenoxylated fatty alcohols or, for example, fatty acids ethanolamides. Such additives improve the hardness of the particles and the dispersion of the pigment in the vehicle. A change of shade may also be effected in this way.

To achieve specific shades it may be expedient to use mixtures of different azo dyes of Formula II.

The new dye-pigments are distinguished by high tinctorial strength and good fastness to light. They are much superior in respect of these properties to the red pigments obtainable by precipitating azo dyes of Formula II with calcium or barium salts. In many cases they also have superior dispersibility. For example, the tinctorial strength is up by up to 50% as compared with lakes containing only barium, and the lightfastness, for example in the case of pigments containing the metal ion combination $$Ca^{++}/Ni^{++}$$

is better by at least one rating.

The advantageous results obtainable according to the present invention are particularly surprising as the known combination of metal ions ($Ca^{++}/Ba^{++}$) in lakes of azo dyes (which is sometimes used to produce azo pigments of specific shades) does not give any similar improvement in the pigment properties, and the lakes of the same azo dyes which contain only chromium, nickel or magnesium are unsuitable owing to their dull shades and low tinctorial strengths.

Dye pigments according to the present invention which have the Formula I where B is nickel, $x$ has a value from 90 to 99.5, preferably 95 to 99, and $y$ has a value from 0.5 to 10, preferably 1 to 5, are of particular industrial interest.

The invention is further illustrated by the following examples in which the part specified are parts of weight.

EXAMPLE 1

50 parts of an aqueous 10% solution of resin soap is added at room temperature to 193 parts of an azo dye, obtained by diazotizing 93.5 parts of 1-amino-4-methyl-2-benzenesulfonic acid and coupling the resultant product with 94 parts of β-hydroxy-naphthoic acid, suspended in approx. 6,000 parts of an aqueous alkaline solution at pH 10.8 to 11.2. Stirring is continued for an hour. To precipitate the azo dye a solution of 148 parts of calcium chloride (70%), 2.4 parts of nickel chloride ($NiCl \cdot 6H_2O$ and 200 parts of water is added. The atomic ratio of calcium: nickel is 99:1. The suspension is stirred for three hours at room temperature, 2,500 parts of water is added, stirring is continued for half an hour at the boil, the product is suction filtered while hot and the residue is washed with water. The red dye-pigment may be used as a press cake or in powder form. If the pigment is dried at 70° C. in vacuo and ground, the yield is 210 to 220 parts. The red pigment obtained exhibits high tinctorial strength and purity. It has the formula

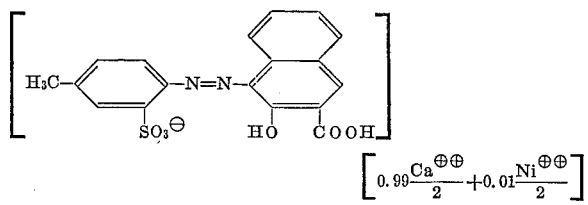

Similar dye-pigments are obtained by effecting precipitation with 200 to 300 parts of aqueous 10% resin soap solution and using the said metal salts at a ratio by atoms of Ca:Ni=97:3 to 95:5.

EXAMPLE 2

300 parts of an aqueous 10% solution of resin soon is added at room temperature to 193 parts of an azo dye, obtained by diazotizing a mixture of 91 parts of 1-amino-4-methyl-2-benzenesulfonic acid and 2.5 parts of 1-amino-5-methyl-2-benzenesulfonic acid and coupling the resultant product with 94 parts of β-hydroxynaphthoic acid, suspended in approx. 6,000 parts of an aqueous alkaline solution at pH 10.8 to 11.2. Stirring is continued for an hour. Precipitation is effected at 17° C. by adding a solution of 135 parts of calcium chloride (70%), 27.5 parts of magnesium chloride ($MgCl_2 \cdot 6H_2O$) and 170 parts of water. The suspension is stirred for three hours at room temperature, 2,500 parts of water is added, stirring is continued for half an hour at the boil, the product is suction filtered while hot and the residue is washed with water. The red dye-pigment may be used as a press cake or, after drying at 70° C. in vacuo and grinding, in powder form. The yield is approx. 220 parts of dry pigment.

EXAMPLE 3

420 parts of an azo dye obtained by diazotizing 209 parts of 1-amino-3-chloro-4-methyl-6-benzenesulfonic acid and coupling the resultant product with 188 parts of β-hydroxynaphthoic acid is suspended as water-wet press cake in 30,000 to 40,000 parts of water. The suspension is adjusted to pH 8.0 with acetic acid and the whole heated to 90° C. A solution of 297 parts of barium chloride ($BaCl_2 \cdot 2H_2O$) and 36 parts of chromium (III) chloride ($CrCl_3 \cdot 3H_2O$) in 600 parts of water is added and the whole is heated to the boil. The dye lake is filtered off, washed free from salt with water and dried at 80° C. in a drying cabinet. The yield of pigment is 520 to 550 parts.

A pigment of similar shade is obtained by using, instead of 1-amino-3-chloro-4-methyl-6-benzenesulfonic acid, the same amount of 1-amino-3-methyl-4-chloro-6-benzenesulfonic acid and otherwise proceeding as described above.

EXAMPLE 4

The aqueous suspension of azo dye described in Example 3 is heated to the boil together with a solution of 297 parts of barium chloride ($BaCl_2 \cdot 2H_2O$) and 32.6 parts of cobalt chloride ($CoCl_2 \cdot 6H_2O$) in 600 parts of water. The dye lake is filtered off, washed free from salt with water and dried at 80° C. in a drying cabinet. The yield is approx. 520 parts of pigment.

EXAMPLE 5

The aqueous suspension of azo dye described in Example 3 is heated to the boil together with a solution of 297 parts of barium chloride ($BaCl_2 \cdot 2H_2O$) and 33.2 parts of aluminum chloride ($AlCl_3 \cdot 6H_2O$) in 600 parts of water. By following the procedure described in Example 4, 530 parts of pigment is obtained. A more bluish shade may be obtained by using a larger proportion of aluminum. A solution that may be advantageously employed consists of 266 parts of barium chloride ($BaCl_2 \cdot 2H_2O$) and 66.4 parts of aluminum chloride ($AlCl_3 \cdot 6H_2O$) in 600 parts of water, the yield being 490 parts of pigment.

We claim:

1. A dye-pigment of the formula

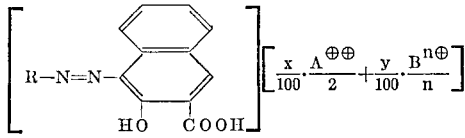

wherein: R is a member selected from the group consisting of

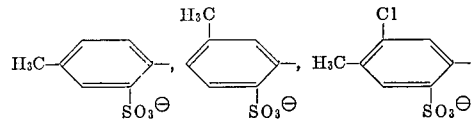

and

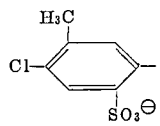

A is a member selected from the group consisting of calcium and barium;

B is a member selected from the group consisting of magnesium, nickel, cobalt, aluminum and chromium;

x has a value of from 70 to 99.5 and y has a value of from 0.5 to 30, x+y being equal to 100; and n denotes the valence of the cation of B.

2. The dye-pigment of the formula

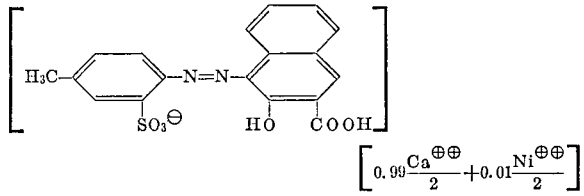

References Cited

UNITED STATES PATENTS

| | | | |
|---|---|---|---|
| 2,694,055 | 11/1954 | Ludwig et al. | 106—289 |
| 2,744,027 | 5/1956 | Struve et al. | 106—289 |
| 2,821,525 | 1/1958 | Waitkins et al. | 106—288 O |

JAMES E. POER, Primary Examiner

U.S. Cl. X.R.

106—289

PO-1050
(5/69)

UNITED STATES PATENT OFFICE
CERTIFICATE OF CORRECTION

Patent No. 3,545,992      Dated December 8, 1970

Inventor(s) Otto Christmann et al

It is certified that error appears in the above-identified patent and that said Letters Patent are hereby corrected as shown below:

Column 2, line 7, "acids" should read -- acid --; line 51, "(NiCl·6H$_2$O" should read -- (NiCl·6H$_2$O) --.

Column 3, line 4, "soon" should read -- soap --; line 56, "4" should read -- 3 --.

SIGNED AND SEALED

FEB 23 1971

(SEAL)
Attest:

Edward M. Fletcher, Jr.
Attesting Officer

WILLIAM E. SCHUYLER, JR.
Commissioner of Patents